United States Patent
Wei et al.

(10) Patent No.: US 10,104,670 B2
(45) Date of Patent: Oct. 16, 2018

(54) METHOD OF ADJUSTING A TRANSMIT POWER FOR DEVICE-TO-DEVICE COMMUNICATION, USER EQUIPMENT, GROUP HEAD OF A DEVICE-TO-DEVICE COMMUNICATION GROUP, AND COMMUNICATION SYSTEM

(71) Applicant: Sony Corporation, Tokyo (JP)

(72) Inventors: Na Wei, Beijing (CN); Feng Chen, Beijing (CN); Dahai Liu, Beijing (CN); Yong Zhao, Beijing (CN)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 28 days.

(21) Appl. No.: 15/111,010

(22) PCT Filed: May 22, 2014

(86) PCT No.: PCT/IB2014/061610
§ 371 (c)(1),
(2) Date: Jul. 12, 2016

(87) PCT Pub. No.: WO2015/107397
PCT Pub. Date: Jul. 23, 2015

(65) Prior Publication Data
US 2016/0330729 A1 Nov. 10, 2016

(30) Foreign Application Priority Data
Jan. 15, 2014 (CN) .......................... 2014 1 0063408

(51) Int. Cl.
*H04W 72/04* (2009.01)
*H04W 52/24* (2009.01)
(Continued)

(52) U.S. Cl.
CPC ....... *H04W 72/048* (2013.01); *H04W 52/244* (2013.01); *H04W 52/246* (2013.01);
(Continued)

(58) Field of Classification Search
CPC ... H04W 76/023; H04W 8/005; H04W 92/18; H04W 72/02; H04W 24/10; H04W 72/1215; H04W 4/005
(Continued)

(56) References Cited

U.S. PATENT DOCUMENTS

2008/0270619 A1* 10/2008 Davies .................... H04L 63/08
709/229
2010/0279647 A1* 11/2010 Jacobs .................... H04W 4/22
455/404.1
(Continued)

FOREIGN PATENT DOCUMENTS

| CN | 101002432 A | 7/2007 |
|---|---|---|
| CN | 102088736 A | 6/2011 |

(Continued)

OTHER PUBLICATIONS

International Search Report and Written Opinion from corresponding International Application No. PCT/IB2014/061610, dated Jul. 15, 2014.
(Continued)

*Primary Examiner* — Fred Casca
(74) *Attorney, Agent, or Firm* — Renner Otto Boisselle and Sklar

(57) ABSTRACT

To adjust a transmit power for device-to-device communication, a user equipment which performs the device-to-device communication using the transmit power detects that the user equipment enters a coverage area of a radio communication unit. The transmit power of the user equipment for the device-to-device communication is decreased in
(Continued)

response to detecting that the user equipment enters the coverage area of the radio communication unit.

13 Claims, 10 Drawing Sheets

(51) Int. Cl.
*H04W 52/28* (2009.01)
*H04W 52/38* (2009.01)
*H04W 72/08* (2009.01)
*H04W 52/08* (2009.01)
*H04W 52/14* (2009.01)
*H04W 52/58* (2009.01)
*H04W 28/06* (2009.01)

(52) U.S. Cl.
CPC ....... *H04W 52/283* (2013.01); *H04W 52/383* (2013.01); *H04W 72/082* (2013.01); *H04W 28/06* (2013.01); *H04W 52/08* (2013.01); *H04W 52/146* (2013.01); *H04W 52/386* (2013.01); *H04W 52/58* (2013.01); *H04W 72/04* (2013.01)

(58) Field of Classification Search
USPC ............. 455/426.1, 522, 127.1, 422.1, 552.1
See application file for complete search history.

(56) References Cited

U.S. PATENT DOCUMENTS

| | | | | |
|---|---|---|---|---|
| 2012/0163235 A1* | 6/2012 | Ho | ...................... | H04W 76/023 370/254 |
| 2013/0194961 A1* | 8/2013 | Kang | ................... | H04B 7/0473 370/252 |
| 2013/0223398 A1* | 8/2013 | Li | ........................ | H04W 72/085 370/329 |
| 2014/0241262 A1* | 8/2014 | Novak | ................ | H04W 72/042 370/329 |
| 2016/0021526 A1* | 1/2016 | Niu | ........................ | H04W 74/02 370/230 |

FOREIGN PATENT DOCUMENTS

| | | |
|---|---|---|
| WO | 2006/016328 | 2/2006 |
| WO | 2006/016331 | 2/2006 |
| WO | 2006016328 A1 | 2/2006 |

OTHER PUBLICATIONS

Nokia et al., "D2D Communication Without Network Coverage", 3GPP Mobile Competence Centre; vol. RAN WG1, Spain, Aug. 2013.

Chinese Search Report corresponding to Chinese Application No. 201410063408.3, dated Sep. 22, 2017.

Chinese Office Action corresponding to Chinese Application No. 201410063408.3, dated Sep. 22, 2017.

* cited by examiner

METHOD OF ADJUSTING A TRANSMIT POWER FOR DEVICE-TO-DEVICE COMMUNICATION, USER EQUIPMENT, GROUP HEAD OF A DEVICE-TO-DEVICE COMMUNICATION GROUP, AND COMMUNICATION SYSTEM

TECHNICAL FIELD

Embodiments of the invention relate to mobile communication systems and terminals of such systems. Embodiments of the invention relate in particular to techniques for controlling a transmit power for device-to-device communication.

BACKGROUND ART

The demand for mobile data and voice communication continues to evidence significant growth. Examples for mobile communication systems include cellular-based wireless communication networks. Such networks include various network nodes. The network nodes may include base stations which respectively provide coverage for a radio cell.

A user equipment of a mobile communication network may be a Proximity Service (ProSe) enabled device. Several ProSe enabled user equipments which are located in proximity to each other are operative to perform device-to-device (D2D) communication. D2D communication allows user equipments of a mobile communication network to directly communicate with each other when the user equipments are located in proximity to each other. D2D communication has a wide variety of applications, including public safety and other use cases. Emergency calls are one example for public safety use cases of D2D communication. For illustration, if a user equipment indicates an emergency call situation, another user equipment may provide repeater function to ensure good network coverage for the user equipment. Direct data or voice communication between user equipments is another example for use cases of D2D communication. For illustration, ProSe enabled user equipments located in proximity to each other may engage in data or voice communication. The respective D2D communication is not transmitted to the radio access network of the mobile communication network.

User equipments may perform D2D communication even when all of the user equipments of a D2D communication group are located outside the coverage of the mobile communication network. The user equipments may use D2D communication resources for the D2D communication. The D2D communication resources may be fixed or may be assigned persistently or semi-persistently by a node of the mobile communication network before the user equipments leave the mobile communication network, for example.

When one or several of the user equipments of the D2D communication group move from out of coverage into a coverage area of a radio communication unit, e.g. of a base station of the mobile communication network, interference problems may arise. The D2D communication resources allocated to the user equipments of the D2D communication group may overlap, in the time and/or frequency domain, with resources used by the radio communication unit for receiving or transmitting radio signals. In order to mitigate such problems, various measures may be taken. For illustration, new D2D communication resources may be allocated for the user equipments of the D2D communication group which are less likely to cause interference. Until the resource allocation takes effect, there may still be interference problems.

SUMMARY

There is a need in the art for techniques which allow a transmit power used by a user equipment for device-to-device communication to be adjusted. There is in particular a need for such techniques which mitigate interference problems when a user equipment of a device-to-device communication group enters a coverage area of a radio communication unit, e.g. of a base station or of a different device-to-device communication group.

According to exemplary embodiments of the invention, a method, a user equipment, a group head of a device-to-device communication group, and a communication system are provided. When a user equipment which performs device-to-device communication enters a coverage area of a radio communication unit, the transmit power of the user equipment for the device-to-device communication is reduced. This mitigates interference problems. The transmit power of a group head and/or of further user equipments of the device-to-device communication group may optionally also be reduced to further mitigate interference problems. The user equipment may use the reduced transmit power for the device-to-device communication until a trigger event is detected which indicates that it is safe to increase the transmit power again, because the risk of interference has in the meantime been mitigated in other ways.

A method according to an embodiment is provided for adjusting a transmit power for device-to-device communication. The method comprises detecting, by a user equipment which performs device-to-device communication using the transmit power, that the user equipment enters a coverage area of a radio communication unit. The method comprises selectively decreasing the transmit power of the user equipment for the device-to-device communication in response to detecting that the user equipment enters the coverage area of the radio communication unit.

By reducing the transmit power of the user equipment for the device-to-device communication, the risk of interference between the device-to-device communication and radio signals transmitted or received by the radio communication unit can be mitigated. The user equipment may transmit signals in the device-to-device communication with a reduced transmit power until the risk of interference has been mitigated in other ways, e.g. by completing a resource allocation for the device-to-device communication.

The method may comprise transmitting, by the user equipment, a report message to an other user equipment using the device-to-device communication to indicate that the user equipment has entered the coverage area of the radio communication unit. This allows the other user equipment which performs the device-to-device communication with the user equipment to also reduce the transmit power for the device-to-device communication, thereby further mitigating interference problems.

The report message may comprise an interference monitor report. The interference monitor report may comprise an indicator which indicates that the user equipment has entered the coverage area of the radio communication unit. The interference monitor report may include an indicator for interference between the resources used by the radio communication unit and the resources used by the user equipment for the device-to-device communication. The interference monitor report allows the other user equipment to take a decision on whether a transmit power of further user equipments in the same device-to-device communication group is to be reduced.

The method may comprise transmitting, by the other user equipment, a command to reduce the transmit power in response to receiving the report message. This allows the other user equipment to reduce the transmit power of at least one further user equipment which is in the same device-to-device communication group as the user equipment which has entered the coverage area of the radio communication unit.

The other user equipment may be a group head of a device-to-device communication group. The device-to-device communication group includes the user equipment and at least one further user equipment. By transmitting the report message to the group head, the group head may take decisions on appropriate interference reduction strategies.

The other user equipment may transmit the command to reduce the transmit power to the at least one further user equipment of the device-to-device communication group. This allows the other user equipment to reduce the transmit power of the at least one further user equipment which is in the same device-to-device communication group as the user equipment.

The command may comprise an indicator for a reduced transmit power level. The indicator may comprise an enable command to enable a pre-defined reduced transmit power level. The indicator may specify the reduced transmit power level, e.g. as a numerical value which represents the reduced transmit power level.

The other user equipment may broadcast the command to all further UEs of the device-to-device communication group and, optionally, the UE. This allows the interference to be mitigated with little signaling overhead.

The other user equipment may transmit the command to a part of the device-to-device communication group. If the other user equipment has information on which part of the device-to-device communication group is located within the coverage area of the radio communication unit, the command may be broadcast to the part of the device-to-device communication group which is located within the coverage area of the radio communication unit. Thereby, the reduction in transmit power may be limited to the UE and any further UE which is located within the coverage area of the radio communication unit. Further UE(s) of the device-to-device communication group which are located outside of the coverage are of the radio communication unit may continue to transmit at higher transmit powers and, therefore, may provide higher data rates.

In response to receiving the command, the at least one further user equipment may reduce its transmit power for the device-to-device communication.

The method may comprise detecting, by the other user equipment, a trigger event for increasing the transmit power. This allows the other user equipment, e.g. the group head, to decide when it is safe to return to a higher transmit power for the device-to-device communication again.

The method may comprise transmitting, by the other user equipment, an other command to the user equipment to increase the transmit power of the user equipment in response to detecting the trigger event. This allows the transmit power and the data rates to be increased again in response to the trigger event.

The trigger event may be a resource allocation performed by the radio communication unit. The trigger event may be that the user equipment leaves the coverage area of the radio communication unit again.

The method may comprise detecting, by the user equipment, a trigger event for increasing the transmit power. This allows the user equipment to decide when it is safe to return to a higher transmit power for the device-to-device communication again.

Selectively decreasing the transmit power of the user equipment may comprise monitoring an interference between radio resources allocated to the user equipment for the device-to-device communication and other radio resources which are used by the radio communication unit for receiving or transmitting the radio signals. Monitoring the interference may comprise determining whether the resources used by the user equipment for the device-to-device communication are identical to or overlap with, in the time and/or frequency domain, the resources used by the radio communication unit.

The method may further comprise receiving, by the user equipment, a resource allocation for the device-to-device communication from the radio communication unit. The method may further comprise increasing the transmit power of the user equipment for the device-to-device communication after receiving the resource allocation. Thereby, the risk of interference may first be reduced by using the reduced transmit power level for the device-to-device communication, and may subsequently be kept small by a resource allocation for the device-to-device communication performed under the control of the radio communication unit.

The radio communication unit may be a base station of a cellular communication network, and the coverage area may be a cell of the cellular communication network.

The radio communication unit may be a radio terminal of a further device-to-device communication group which does not include the user equipment.

A user equipment according to an embodiment comprises a wireless interface for communication with a mobile communication network. The user equipment comprises a processing device coupled to the wireless interface. The processing device is configured to control the wireless interface to perform a device-to-device communication. The processing device is configured to detect that the user equipment enters a coverage area of a radio communication unit. The processing device is configured to selectively decrease a transmit power of the user equipment for the device-to-device communication when the device-to-device communication causes interference with radio signals which are transmitted or received by the radio communication unit. The user equipment having such a configuration is configured to mitigate interference problems when the user equipment moves into the coverage area of the radio communication unit.

The processing device may be further configured to control the wireless interface to transmit a report message to an other user equipment using the device-to-device communication.

The processing device may be configured to generate the report message which comprises an interference monitor report. The interference monitor report may comprise an indicator which indicates that the user equipment has entered the coverage area of the radio communication unit.

The processing device may be configured to receive, from the other user equipment, an other command to increase the transmit power of the user equipment in response to a trigger event. This allows the user equipment to decide when it is safe to return to a higher transmit power for the device-to-device communication again.

The processing device may be configured to detect a trigger event for increasing the transmit power. This allows the user equipment to decide when it is safe to return to a higher transmit power for the device-to-device communication again.

The trigger event may be a resource allocation performed by the radio communication unit. The trigger event may be that the user equipment leaves the coverage area of the radio communication unit again.

The processing device may be configured to monitor an interference between radio resources allocated to the user equipment for the device-to-device communication and other radio resources which are used by the radio communication unit for receiving or transmitting the radio signals.

The processing device may be configured to receive, via the wireless interface, a resource allocation for the device-to-device communication from the radio communication unit. The processing device may be configured increase the transmit power of the user equipment for the device-to-device communication after receiving the resource allocation.

The user equipment may be configured to perform the method of any one of the embodiments disclosed herein.

A group head for a device-to-device communication group according to an embodiment comprises a wireless interface for device-to-device communication. The group head may comprise a processing device coupled to the wireless interface. The processing device may be configured to receive, via the wireless interface, a report message from a user equipment of the device-to-device communication group which indicates that the user equipment has entered a coverage area of a radio communication unit. The processing device may be configured to control the wireless interface to transmit a command to the user equipment or to at least one further user equipment of the device-to-device communication group to reduce a transmit power for the device-to-device communication in response to receiving the report message.

The group head having such a configuration may control the transmit power within the device-to-device communication group to mitigate interference problems.

The processing device may be configured to control the wireless interface to transmit radio signals with a reduced transmit power in the device-to-device communication to the user equipment.

The command may comprise an indicator for a reduced transmit power level of the user equipment. The indicator may comprise an enable command to enable a pre-defined reduced transmit power level. The indicator may specify the reduced transmit power level, e.g. by defining a numerical value.

The processing device may be configured to control the wireless interface to broadcast the command to all further UEs of the device-to-device communication group and, optionally, also the UE.

The processing device may be configured to control the wireless interface to transmit the command to only a part of the device-to-device communication group. If the group head has information on which part of the device-to-device communication group is located within the coverage area of the radio communication unit, the command may be broadcast to the part of the device-to-device communication group which is located within the coverage area of the radio communication unit.

The processing device may further be configured to detect a trigger event for increasing the transmit power, and transmit an other command to the user equipment to increase the transmit power of the user equipment in response to detecting the trigger event.

The trigger event may be a resource allocation performed by the radio communication unit. The trigger event may be that the user equipment leaves the coverage area of the radio communication unit again.

The group head may be a user equipment of a mobile communication network. The group head may be a user equipment of a cellular communication network.

According to another embodiment, a communication system is provided which comprises at least one user equipment according to an embodiment and a group head according to an embodiment.

The communication system may further comprise a radio communication unit. The radio communication unit may be a base station. The at least one user equipment may be configured to detect when it enters a coverage area of the radio communication unit.

In the methods, devices, and systems according to embodiments, the resources used by the user equipment and/or group head for the device-to-device communication may be periodic uplink resources of the radio communication unit.

In the methods, devices, and systems according to embodiments, the transmit power of the user equipment may be reduced from a normal power level to a reduced power level which is less than the normal power level to mitigate interference problems. The reduced power level may be set such that it meets minimum connection quality requirements. The reduced power level may be set such that it supports only control signaling. The reduced power level may be set such that it supports only low data rate control signaling.

In the methods, devices, and systems according to embodiments, reducing the transmit power may be performed by entering a low transmit power mode. The low transmit power mode may have a predefined format of reduced transmission bandwidth and/or a reduced maximum data rate. The low transmit power mode may allow transmission only on a transmit control channel, with a data channel being disabled when the UE or group head transmits in the low transmit power mode.

In the methods, devices, and systems according to embodiments, the transmit power of the group head and/or of further user equipment(s) of a device-to-device communication group may be reduced from a normal power level to a reduced power level which is less than the normal power level to mitigate interference problems. The reduced power level may be set such that it meets minimum connection quality requirements. The reduced power level may be set such that it supports only control signaling. The reduced power level may be set such that it supports only low data rate control signaling.

The methods, devices, and systems according to various embodiments provide a mechanism which mitigates interference problems when a user equipment of a device-to-device communication group enters a coverage area of a base station or of another device-to-device communication group.

Although specific features described in the above summary and the following detailed description are described in the context of specific embodiments and aspects of the invention, the features of the embodiments and aspects may be combined with each other unless specifically noted otherwise.

BRIEF DESCRIPTION OF DRAWINGS

Embodiments of invention will now be described in more detail with reference to the accompanying drawings in which like or identical reference numerals designate like or identical elements.

DESCRIPTION OF EMBODIMENTS

Figure 1:
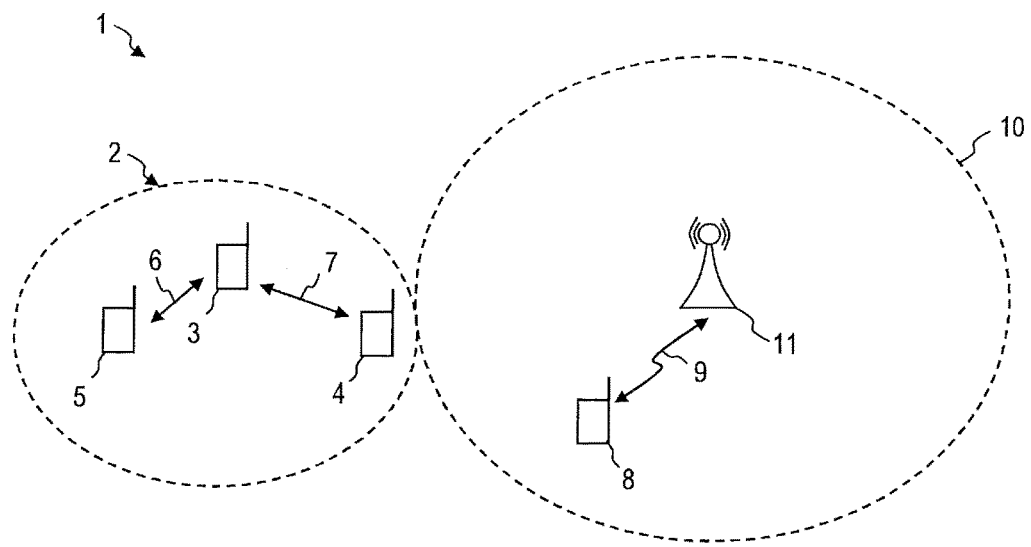
FIG. 1 shows a communication system according to an embodiment.

In the following, exemplary embodiments of the invention will be described in more detail. It has to be understood that the features of the various exemplary embodiments described herein may be combined with each other unless specifically noted otherwise. Identical or similar reference numerals refer to identical or similar components.

While exemplary embodiments will be described with reference to certain use cases for device-to-device (D2D) communication, it is to be understood that the techniques for adjusting a transmit power for D2D communication may be used for a wide variety of use cases, including public safety use cases and other commercial use cases. While exemplary embodiments will be described in the context of certain cellular mobile communication networks, e.g. Long Term Evolution (LTE) networks, the embodiments are not described to such mobile communication techniques.

While exemplary embodiments will be described with reference to scenarios in which a user equipment of a device-to-device communication group enters a cell served by a base station and/or an area covered by a further device-to-device communication group, the embodiments are not limited to these scenarios.

FIG. 1 shows a communication system 1 according to an embodiment. The communication system 1 includes a mobile communication system which is configured as a cellular wireless communication network. The cellular wireless communication network may comprise a plurality of base stations. One of the base stations is shown as base station 11 in FIG. 1. The base stations may communicate with each other via wireless radio communications or via an operator core network. The cellular wireless communication network may be a Long Term Evolution (LTE) network. A radio access network (RAN) of the cellular wireless communication network may be an evolved UTRAN (E-UTRAN), with the base station 11 being an evolved Node B (eNodeB). The base station 11 may be connected to a Mobility Management Entity (MME) and/or Serving Gateway (S-GW) in the operator core network.

The base station 11 provides a radio cell 10 which is the coverage area of the base station 11. Within the radio cell 10, user equipments (UEs), e.g. a UE 8, may communicate directly with the base station 11 via radio frequency communication 9.

A device-to-device (D2D) communication group 2 may comprise a UE 4 which has a wireless interface configured to communicate with the base station 11. The UE 4 is configured to communication in device-to-device communication 7 with a group head 3 or at least one further UE 5 of the D2D communication group 2. The UE 4, the at least one further UE 5, and the group head 3 may respectively communicate with each other over the wireless interfaces which are also configured to communicate with the RAN of the cellular communication network. D2D communication within the D2D communication group 2 may be implemented as a direct communication. The radio signals 6, 7 which are transmitted between the UE 4, the at least one further UE 5, and the group head 3 may not be processed by the base station 11. The radio signals 6, 7 transmitted in the D2D communication may not pass the RAN of the communication network. The radio signals 6, 7 transmitted in the D2D communication may not be processed by a core network of the wireless cellular communication network. The UE 4, the at least one further UE 5, and the group head 3 which are configured for D2D communication may use the same wireless interface for communicating with the RAN and for D2D communication.

While one of the terminals of the D2D communication group 2 may act as a group head 3 which fulfills certain management functions within the D2D communication group, it is to be understood that the group head 3 may also be a UE of the cellular wireless communication system. The group head function may be activated selectively as the need for D2D communication arises. In still other implementations, it is not required for the D2D communication group 2 to have a group head.

Figure 2:
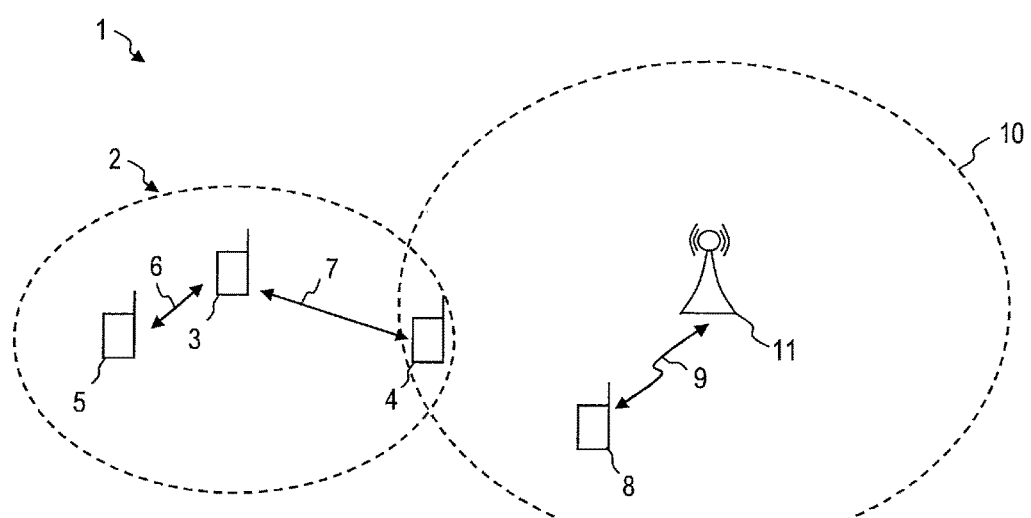
FIG. 2 shows the communication system of FIG. 1 when a user equipment according to an embodiment has entered a coverage area of a base station.

As illustrated in FIG. 1, the UE 4, the at least one further UE 5 and the group head 3 of the D2D communication are all located outside of the coverage area of the base station 11, which corresponds to the radio cell 10. As illustrated in FIG. 2, the UE 4 may enter the radio cell 10 by moving from out-of-coverage into coverage. This creates a risk of interference between the D2D communication within the D2D communication group and radio signals 9 which are transmitted or received by the base station 11. The base station 11 is one example for a radio communication unit, for which there is a risk that undesired interference occurs when the UE 4 of the D2D communication group changes its position such that it enters the coverage area of the base station 11.

As will be explained in more detail below, when the UE 4 detects that it enters the coverage area of the base station 11, the UE 4 may start using a low transmit power mode for the D2D communication. The transmit power of the UE 4 for the D2D communication with the group head 3 and, if present, the at least one further UE 5 may be reduced compared to the transmit power level used before the UE 4 entered the coverage area of the base station 11. The group head 3 may also enter a low transmit power mode for the D2D communication. The low transmit power mode may be maintained for the D2D communication until the UE 4 and/or the group head 3 detect a trigger event which causes the UE 4 and the group head 3 to increase the transmit power for the D2D communication again. The trigger event may be any event which indicates that the risk of interference between the D2D communication within the D2D communication group 2 and radio communication 9 with the base station 11 is mitigated. Examples for such trigger events include a D2D resource allocation by the base station 11 and/or a movement of the UE 4 which causes the UE 4 to leave the coverage area of the base station 11.

The low transmit power mode may have a predefined format of reduced transmission bandwidth and/or a reduced maximum data rate. The low transmit power mode may allow transmission only on a transmit control channel, with a data channel being disabled when the UE or group head transmits in the low transmit power mode. The low transmit power mode of the UE 4 may be adapted to be configured by the group head 3, for example. The adaptation of the low transmit power mode may include defining a reduced transmission bandwidth and/or a reduced maximum data rate and/or disabling a data channel.

The techniques disclosed herein are not only useful when the UE 4 of a D2D communication group 2 enters a coverage area of a base station, but may mitigate interference problems in a wide variety of other scenarios. One further scenario is when the UE 4 of a D2D communication group 2 enters a coverage area of a further D2D communication group 22 which does not include the UE 4, as illustrated in FIG. 3 and FIG. 4.

Figure 3:
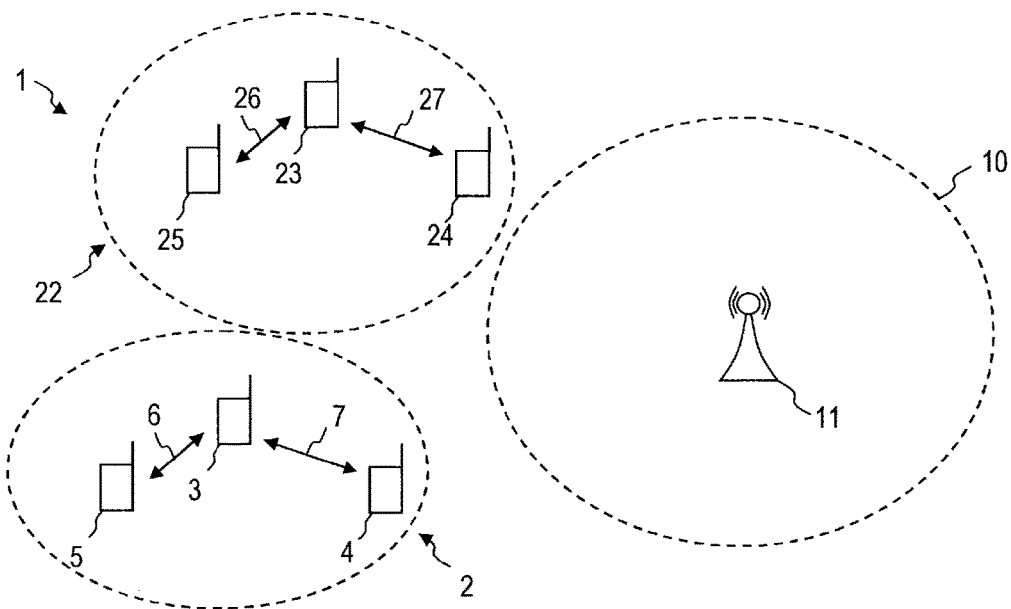
FIG. 3 shows a communication system according to an embodiment.
Figure 4:
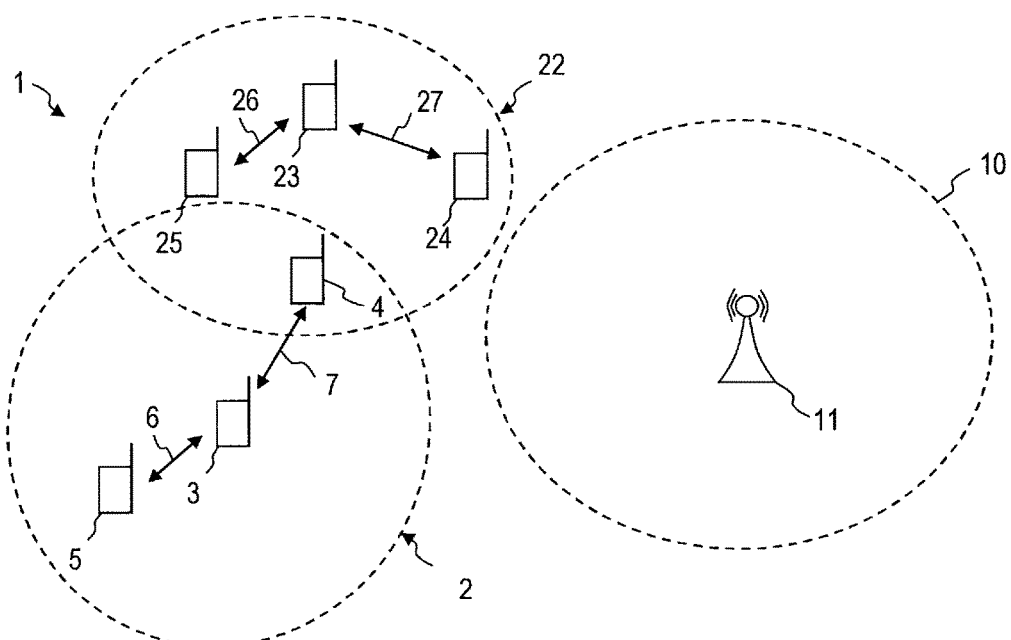
FIG. 4 shows the communication system of FIG. 3 when a user equipment according to an embodiment has entered a coverage area of a further device-to-device communication group.

FIG. 3 and FIG. 4 illustrate a scenario in which a UE 4 of a D2D communication group 2 starts using a low power transmit mode for the D2D communication to mitigate the risk of interference with D2D communication 26, 27 of a further D2D communication group 22. The further D2D communication group 22 includes several terminals 23, 24, 25 which communicate directly via radio signals 26, 27, similarly to the terminals of the D2D communication group 2. When the UE 4 enters the coverage area of the further D2D communication group 22, the UE 4 may start using the low transmit power mode for the D2D communication. The transmit power of the UE 4 for the D2D communication with the group head 3 and, if present, the at least one further UE 5 may be reduced compared to the transmit power level used before the UE 4 entered the coverage area of the further D2D communication group 22. The group head 3 may also enter a low transmit power mode for the D2D communication. The low transmit power mode may be maintained for the D2D communication until the UE 4 and/or the group head 3 detect a trigger event which causes the UE 4 and the group head 3 to increase the transmit power for the D2D communication again. The trigger event may be any event which indicates that the risk of interference between the D2D communication within the D2D communication group 2 and radio communication within the further D2D communication group 22 is mitigated.

In any one of the various scenarios illustrated above, the risk of interference can be reduced by reducing the transmit power for the D2D communication of the UE 2, which allows other and more time-consuming procedures for interference reduction to be performed. This applies even when the D2D communication within the D2D communication group uses resources in the time and/or frequency domain which are similar or identical with resources used for communication within the radio cell 10 or within the further D2D communication group 22. The reduced transmit power for the D2D communication may be maintained until the risk of interference has been addressed by completing another procedure for interference reduction. One example of such a procedure is an allocation of D2D communication resources which is performed by the base station 11.

Figure 5:
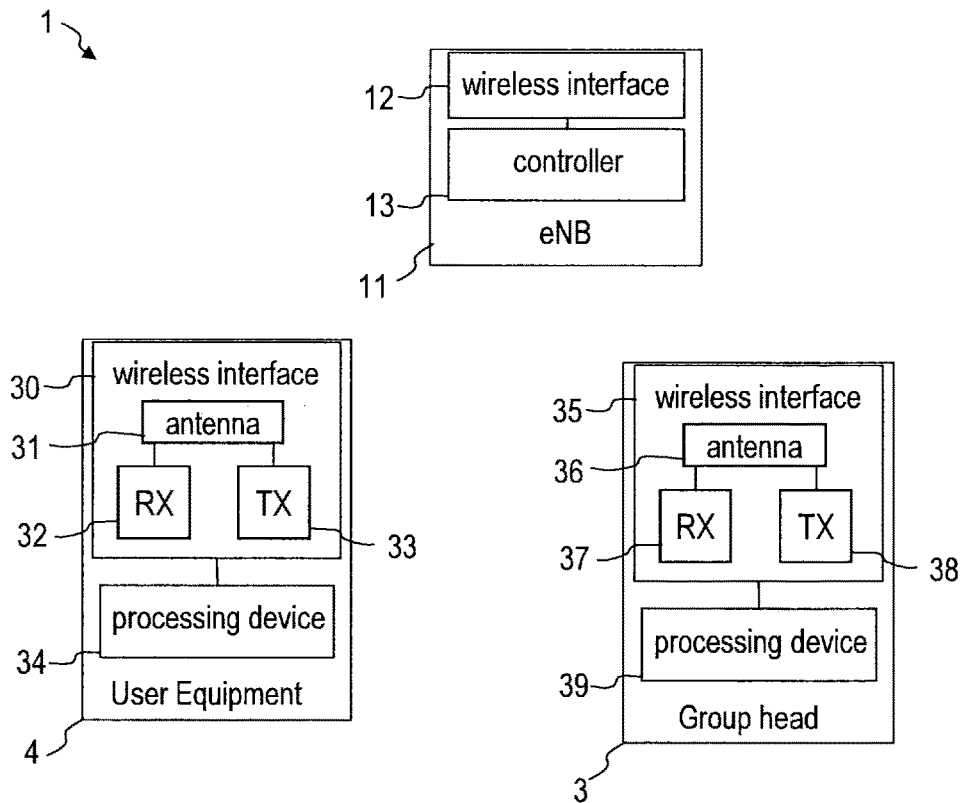
FIG. 5 is a block diagram representation of a communication system according to an embodiment.

FIG. 5 is a schematic block diagram of a communication system 1 according to an embodiment. The base station 11 of the RAN 10 may be connected to a node of the RAN or the core network (CN). For illustration, for a base station 11 implemented as an eNodeB, the base station 11 may be connected to an MME or S-GW.

The UE 4 has a wireless interface 30 which includes an antenna 31. The wireless interface 30 may be configured to communicate with the RAN 10. The wireless interface 30 may be configured for communication over the E-UTRA air interface.

The UE 4 has a processing device 34 connected to the wireless interface 30. The processing device 34 may comprise one or several microprocessors, one or several microcontrollers, one or several processors, one or several control devices, one or several application specific integrated circuits (ASICs) and/or a combination of such devices. The processing device 34 may be configured to control the wireless interface 30 to detect a group head 3 located in proximity to the UE 4. The processing device 34 may be configured to control the wireless interface 30 to perform D2D communication with the group head 3.

The processing device 34 may be configured to evaluate signals received at a receiver path 32 to detect that the UE 4 enters the coverage area of a radio communication unit which is not included in the D2D communication group. The processing device 34 may be configured to control a transmitter path 33 of the wireless interface 30 to operate in a low transmit power mode when detecting that the UE 4 has entered the coverage area of the radio communication unit, which may be the base station 11, for example. The processing device 34 may further be configured to control the transmitter path 33 to transmit a report message to the group head 3 via an antenna 31. The report message may include an interference monitor report which indicates that the UE 4 has detected that it entered the coverage area of the radio communication unit.

The processing device 34 may be configured to determine whether the low transmit power mode for the D2D communication is to be terminated and the UE 4 is to return to a normal transmit power mode. The processing device 34 may monitor whether an other command is received via the receiver path 32 of the wireless interface 30 from the group head 3, which causes the UE 4 to return to the normal transmit power mode for the D2D communication.

The group head 3 has a wireless interface 35 including an antenna 36, a receiver path 37, and a transmitter path 38, and a processing device 39. These entities may be configured in the same way as explained for the UE 4. In particular, the wireless interface 35 may be configured to communicate with the RAN 10. The wireless interface 35 may be configured for communication over the E-UTRA air interface. The wireless interface 35 may further be configured for D2D communication with the wireless interface 20 of the UE 4.

The processing device 39 of the group head 3 may be configured to receive the report message from the UE 4 via the transmitter path 38. The report message may indicate that the UE 4 has detected that it entered the coverage area of the radio communication unit, e.g. the base station 11. In response to receiving the report message, the processing device 39 may start using a low transmit power mode for the D2D communication with the UE 4. The processing device 39 may optionally transmit a command to reduce the transmit power to at least one further UE 5 of the D2D communication group controlled by the group head 3. The processing device 39 may broadcast the command to reduce the transmit power to all or part of the D2D communication group controlled by the group head 3.

The processing device 39 of the group head 3 may be configured to detect a trigger event which indicates that it is safe to return to the normal transmit power mode for the D2D communication. In response to detecting the trigger event, the processing device 39 may control the transmitter path 38 to transmit the other command to the UE 4 and, optionally, the at least one further UE 5, to cause the UE 4 and the at least one further UE 5 to return to the normal transmit power mode. In response to detecting the trigger event, the group head 3 may itself return to the normal transmit power mode and may increase the transmit power again.

Figure 6:
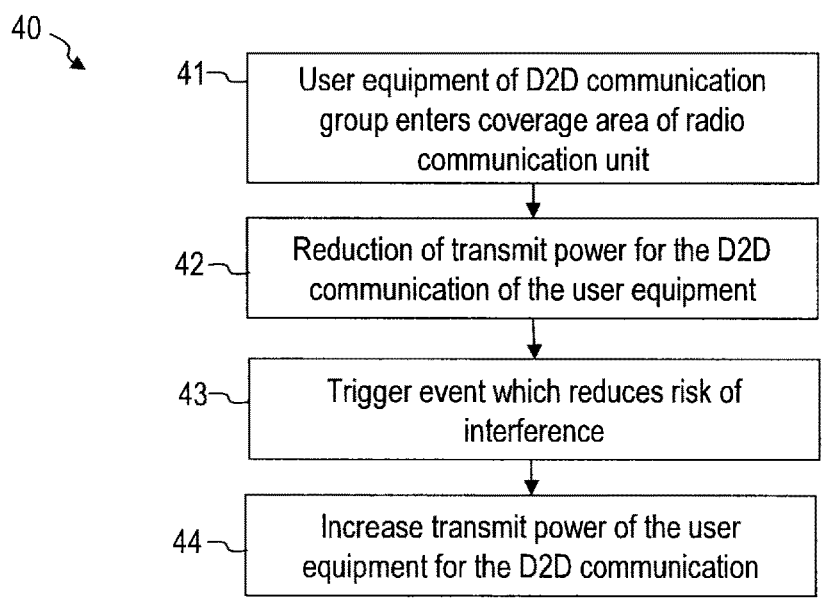
FIG. 6 is a flow chart of a method according to an embodiment.

FIG. 6 is a flow chart of a method 40 of adjusting the transmit power for the D2D communication according to an embodiment. The transmit power is temporarily reduced when an overlap between a D2D communication group and a coverage area of a radio communication unit creates the risk of interference. The transmit power may be restored to a higher value, e.g. the transmit power level before the UE moved into coverage from out-of-coverage, when a trigger event is detected which indicates that it is safe to increase the transmit power again.

At 41, the UE of a D2D communication group enters a coverage area of a radio communication unit. The radio communication unit may be a base station, e.g. an eNodeB. The coverage area may be a radio cell. The radio communication unit may be a terminal of a further device-to-device communication group. The detection at 41 may be performed by the UE monitoring signals received via its wireless interface.

At 42, the UE reduces its transmit power for the D2D communication in response to detecting that the UE has entered the coverage area of the radio communication unit. The transmit power may be reduced to a level which still meets the minimum connection quality requirements. The transmit power may be reduced to a level which allows signaling to be performed between the UE and a group head, e.g. with a low data rate.

At 43, a trigger event is detected which indicates that it is safe to increase the transmit power for the D2D communication again. The trigger event may be detected by the UE itself or by a group head of the D2D communication group in which the UE is included. The trigger event may be a resource allocation by a base station of the cellular communication network or a movement of the UE out of the coverage area of the radio communication unit.

At 44, the transmit power of the UE for the D2D communication may be increased again. The transmit power may be increased to a normal transmit power mode. The normal transmit power mode may be configured to supports a pre-defined target data rate signaling transmission. The normal transmit power mode may be configured to supports a pre-defined target data rate signaling transmission which exceeds 1 Mbps, 5 Mbps, or even greater target data rates.

In the method 40, not only the UE 4 which enters the coverage area of the radio communication unit, but also the group head and/or at least one further UE of the D2D communication group may start using the low transmit power mode when the UE detects that it has entered the coverage area of the radio communication unit.

Figure 7:
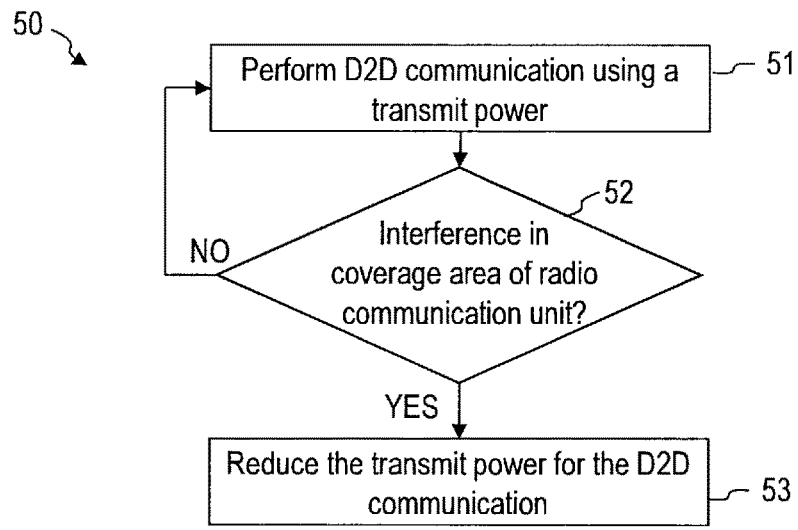
FIG. 7 is a flow chart of a method according to an embodiment which is performed by a user equipment according to an embodiment.

FIG. 7 is a flow chart of a method 50 according to an embodiment. The method 50 may be performed by a UE according to an embodiment.

At 51, the UE performs D2D communication using a transmit power. The transmit power for the D2D communication may be set such that a data rate of the D2D communication fulfills a predefined target data rate, for example.

At 52, the UE determines whether there is a risk of interference between the D2D communication and radio signals transmitted to or from a radio communication unit. The UE may detect whether it has entered the coverage area of the radio communication unit to determine whether there is a risk of interference. If there is not risk of interference, the UE may continue to perform D2D communication using the transmit power at 51.

At 53, when it is determined that there is a risk of interference, the transmit power for the D2D communication is reduced. The transmit power may be reduced autonomously by the UE, without requiring any command from the group head. The transmit power may be reduced by the UE after the UE has received a command to reduce the transmit power from the group head. The UE may use the reduced transmit power for transmitting radio signals in the D2D communication until a return to a normal power mode is triggered. The reduced transmit power may be set such that it fulfills requirements for control signaling at a low data rate, for example.

Figure 8:
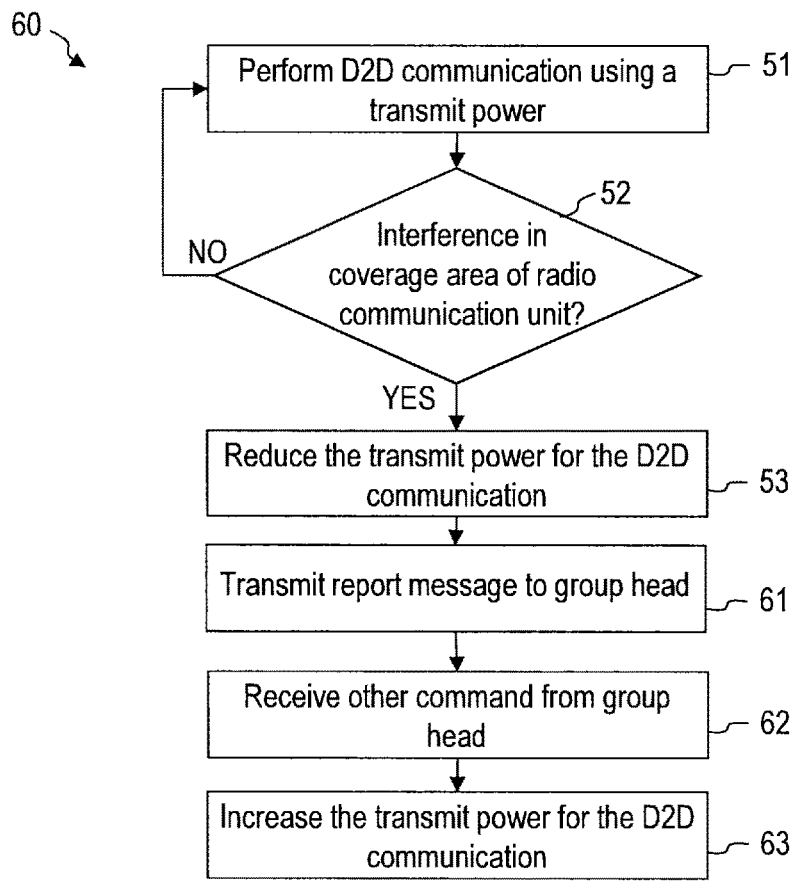
FIG. 8 is a flow chart of a method according to an embodiment which is performed by a user equipment according to an embodiment.

FIG. 8 is a flow chart of a method 60 according to an embodiment. The method 60 may be performed by a UE according to an embodiment. Steps 51-53 may be performed as described with reference to FIG. 7.

At 61, in response to detecting that the UE has entered the coverage area of the radio communication unit, the UE transmits a report message to the group head. The UE may include an interference monitor report in the report message. The interference monitor report may indicate that the UE has entered the coverage area of the radio communication unit. The interference monitor report may include an indicator that the radio resources used by the UE for the D2D communication and the radio resources used by the radio communication unit for transmitting or receiving signals overlap in a time domain and/or frequency domain. The report message may trigger the group head and, optionally, at least one further UE of the D2D communication group to also enter a low transmit power mode for the D2D communication.

At 62, the UE receives an other command from the group head which indicates that the UE can increase the transmit power again, e.g. by returning to a normal transmit power mode.

At 63, in response to receiving the other command at 62, the UE may increase the transmit power for the D2D communication. The UE may increase the transmit power for the D2D communication to the level which was used at step 51. The UE may return to a normal transmit power mode in which a data rate meets a certain target, e.g. a pre-defined target bit rate.

Figure 9:
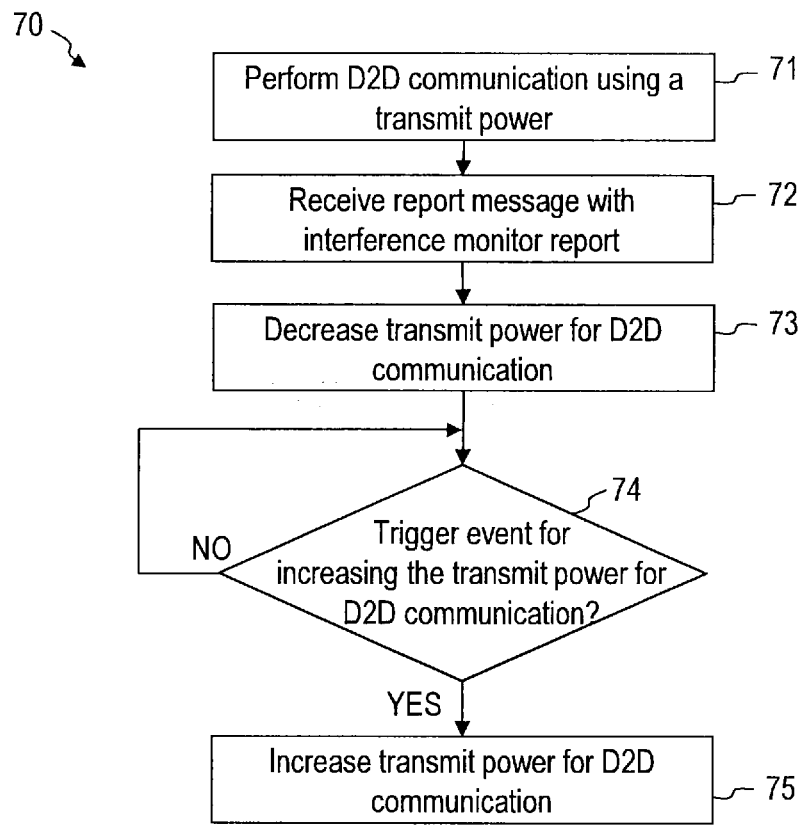
FIG. 9 is a flow chart of a method according to an embodiment which is performed by a user equipment according to an embodiment.

FIG. 9 is a flow chart of a method 70 according to an embodiment. The method 70 may be performed by a group head of a D2D communication group according to an embodiment.

At 71, the group head performs D2D communication with the UE using a transmit power. The transmit power for the D2D communication may be set such that a data rate of the D2D communication fulfills a predefined target data rate, for example.

At 72, the group head receives a report message from the UE which indicates that the UE has now entered a coverage area of a radio communication unit, e.g. of a base station or of a further D2D communication group. The report message may include an interference monitor report which indicates that the UE has entered the coverage area of the radio communication unit. The report message may include an indicator that the radio resources used by the UE for the D2D communication and the radio resources used by the radio communication unit for transmitting or receiving signals overlap in a time domain and/or frequency domain.

At 73, in response to receiving the report message, the group head may decrease its transmit power for the D2D communication with the UE. The group head may optionally request at least one further UE of the D2D communication group to reduce the transmit power for the D2D communication. The group head may use the reduced transmit power for transmitting radio signals in the D2D communication to the UE until a return to a normal power mode is triggered. The reduced transmit power may be set such that it fulfills requirements for control signaling at a low data rate, for example.

At 74, the group had may determine whether a trigger event occurred which makes it safe to increase the transmit power for the D2D communication again without causing interference problems. The trigger event may be receipt of a resource allocation which is transmitted by a base station and relayed to the group head by the UE, for example. If the trigger event is not detected, the monitoring at 74 may be continued.

At 75, in response to detecting the trigger event at 74, the group head may increase the transmit power for the D2D communication. The group head may increase its own transmit power for D2D communication. The group head may increase its own transmit power by returning to the normal transmit power mode. The group head may transmit an other command to the UE and, optionally, the at least one further UE of the D2D communication group. The other command may cause the UE and, optionally, the at least one further UE of the D2D communication group to increase their transmit power for the D2D communication again.

Figure 10:
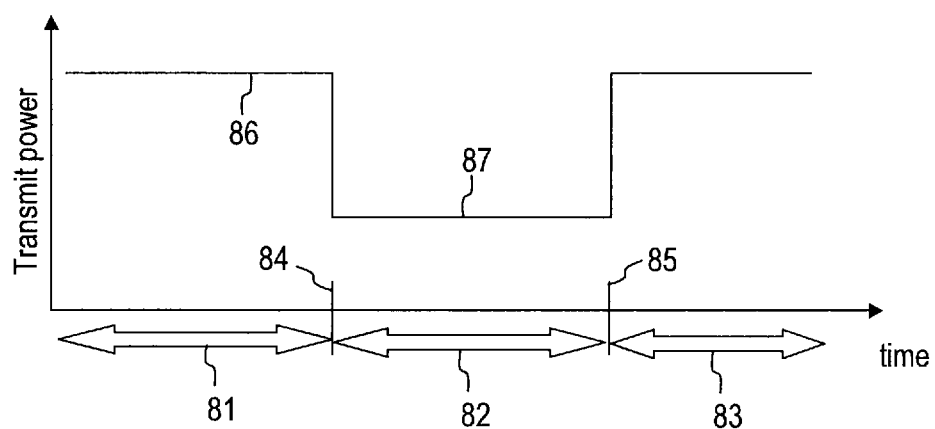
FIG. 10 illustrates an adjustment of a transmit power for device-to-device communication according to an embodiment.

FIG. 10 illustrates a transmit power of the UE 4 and/or the group head 3 as a function of time. In a time interval 81, the UE 4 and the group head 3 are located outside of the coverage area of a radio communication unit. The transmit power is at a first transmit power level 86. At a time 84, the UE 4 detects that it enters the coverage area of the radio communication unit, which causes a risk of interference. The UE 4 and/or the group head 3 enter a low transmit power mode. The transmit power is at a second transmit power level 87 in a further time interval 82. At a later time 85, a trigger event detected by the UE 4 and/or the group head 3 indicates that it is safe to increase the transmit power level for the D2D communication again without causing interference problems. The transmit power level is increased to the first transmit power level 86 in a still further time interval 83. In the still further time interval 83, the risk of undesired interference between D2D communication and radio signals received or transmitted by the radio communication unit may be mitigated by resource allocation. In the still further time interval 83, the resources used for the D2D communication may be allocated as periodic uplink resources of the base station. The resources used for the D2D communication in the still further time interval 83 may be allocated by the base station to the D2D communication group. The allocation may take place during the further time interval 82 in which the reduced transmit power for the D2D communication mitigates the risk of interference.

Figure 11:
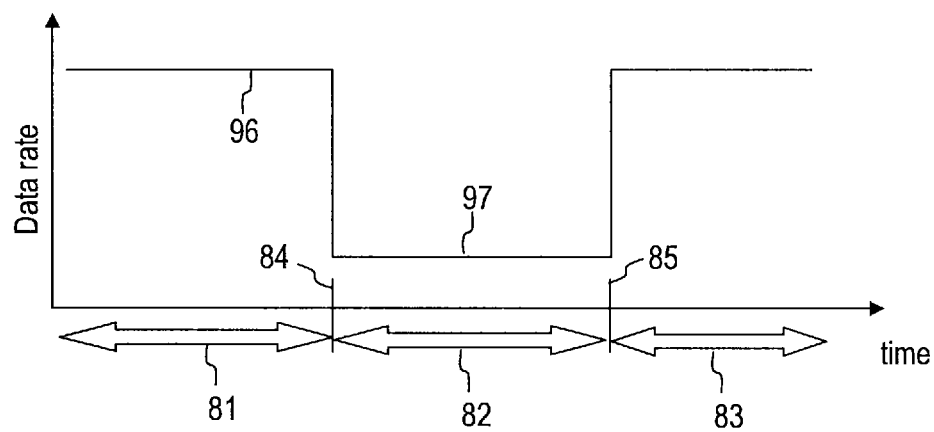
FIG. 11 illustrates an adjustment of a data rate which is associated with an adjustment of the transmit power for device-to-device communication according to an embodiment.

The data rate for the D2D communication may vary as a function of the transmit power, as illustrated in FIG. 11.

FIG. 11 shows a variation in data rate for the D2D communication. In the time interval 81 in which none of the terminals of the D2D communication group is within the coverage area of the radio communication unit, the data rate of the D2D communication between the UE and the group head is a first data rate 96. In the further time interval 82, in which the UE and/or the group head operate in the reduced transmit power mode, the data rate of the D2D communication between the UE and the group head is a second data rate 97 which is less than the first data rate 96. The reduced transmit power 87 may be selected such that the second data rate 97 allows control signaling, but does not allow voice or data exchange. The reduced transmit power 87 may be selected such that the second data rate 97 allows control signaling with a low data rate, for example. In the still further time interval 83, in which the UE and/or the group head have returned to normal transmit power mode, the data rate of the D2D communication between the UE and the group head is increased to the first data rate 96 again.

Figure 12:
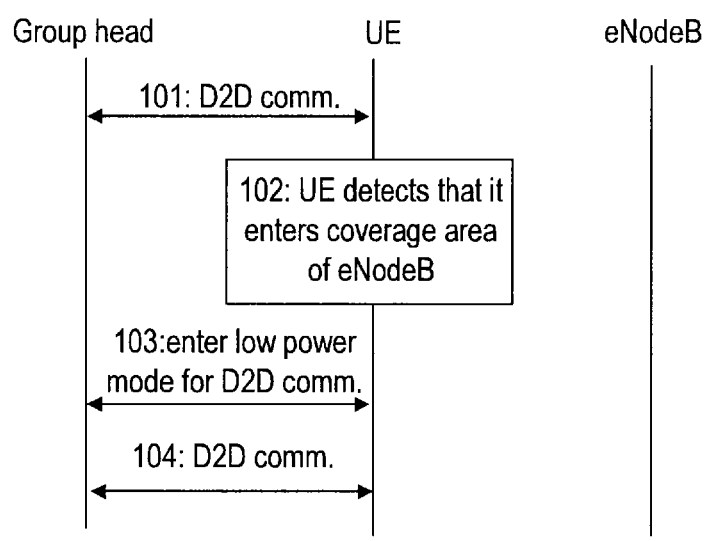
FIG. 12 illustrates signaling in a communication system according to an embodiment.

FIG. 12 is a diagram which shows signaling in a communication system according to an embodiment. A UE and a group head of a D2D communication group perform D2D communication 101 while the UE and the group head are located outside of a coverage area of an eNodeB.

At 102, the UE detects that it enters the coverage area of the eNodeB. The UE may monitor signals received at its wireless interface to detect that it enters the coverage area of the eNodeB.

At 103, both the UE and the group head enter a low power mode for D2D communication. Entering the low power mode for the D2D communication at 103 may comprise a transmission of a report message from the UE to the group head and/or a transmission of a command by the group head.

The UE and the group head then perform D2D communication 104. In the D2D communication 104, the transmit power of the UE is less than the transmit power of the UE in the D2D communication 101. In the D2D communication 104, the transmit power of the group head is less than the transmit power of the group head in the D2D communication 101.

Figure 13:
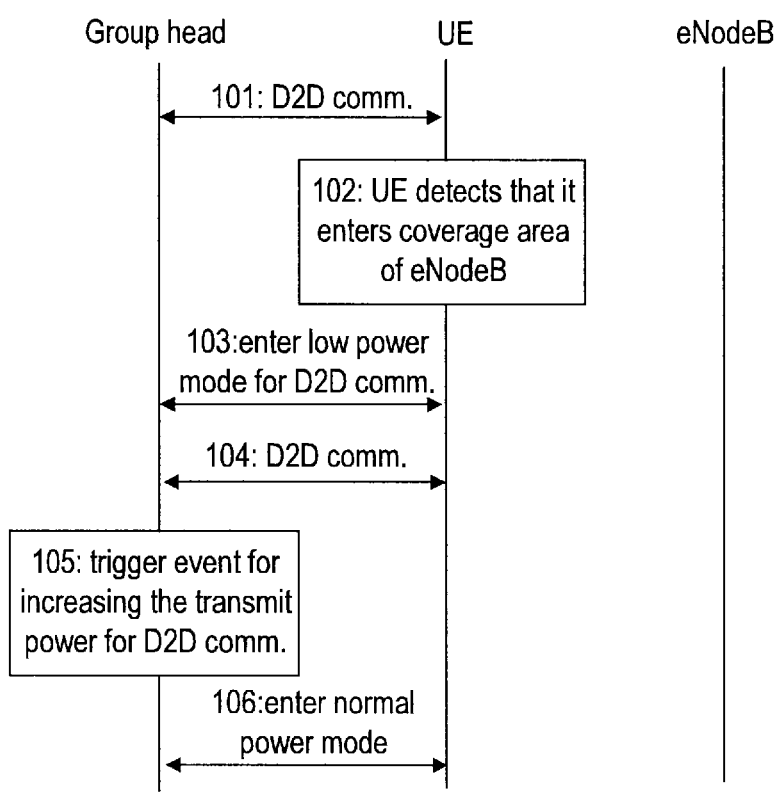
FIG. 13 illustrates signaling in a communication system according to an embodiment.

FIG. 13 is a diagram which shows signaling in a communication system according to an embodiment. In the signaling of FIG. 13, the UE and the group head may enter a low transmit power mode as described with reference to FIG. 12.

At 105, the group head may detect a trigger event which indicates that the transmit power may be increased again for the D2D communication. The trigger event may be the allocation of resources for the D2D communication by the eNodeB, as will be explained in more detail with reference to FIG. 14. The trigger event may be a confirmation message from the eNodeB which indicates that the resources presently used by the UE and group head for the D2D communication do not cause interference. Any such message may be relayed to the group head by the UE which is located within the coverage area of the eNodeB. Alternatively or additionally, the trigger event may be that the UE detects that it is no longer located within the coverage area of the eNodeB and informs the group head thereof.

At 106, the group head and the UE start using the normal transmit power mode for the D2D communication. The transmit power of the UE and the transmit power of the group head for the D2D communication may be increased again, e.g. to the level used in the D2D communication 101. Entering the normal transmit power mode 106 may comprise transmission of an other command from the group head to the UE to request the UE to increase the transmit power for the D2D communication again.

While the trigger event is detected at the group head in the signaling of FIG. 13, the detection of the trigger event which causes the transmit power for the D2D communication to be increased again may be performed by the UE in other implementations.

The trigger event which causes the UE and the group head to increase the transmit power for the D2D communication again because it is safe to increase the transmit power without causing significant interference may be a resource allocation performed by the eNodeB, as will be explained in more detail with reference to FIG. 14.

Figure 14:
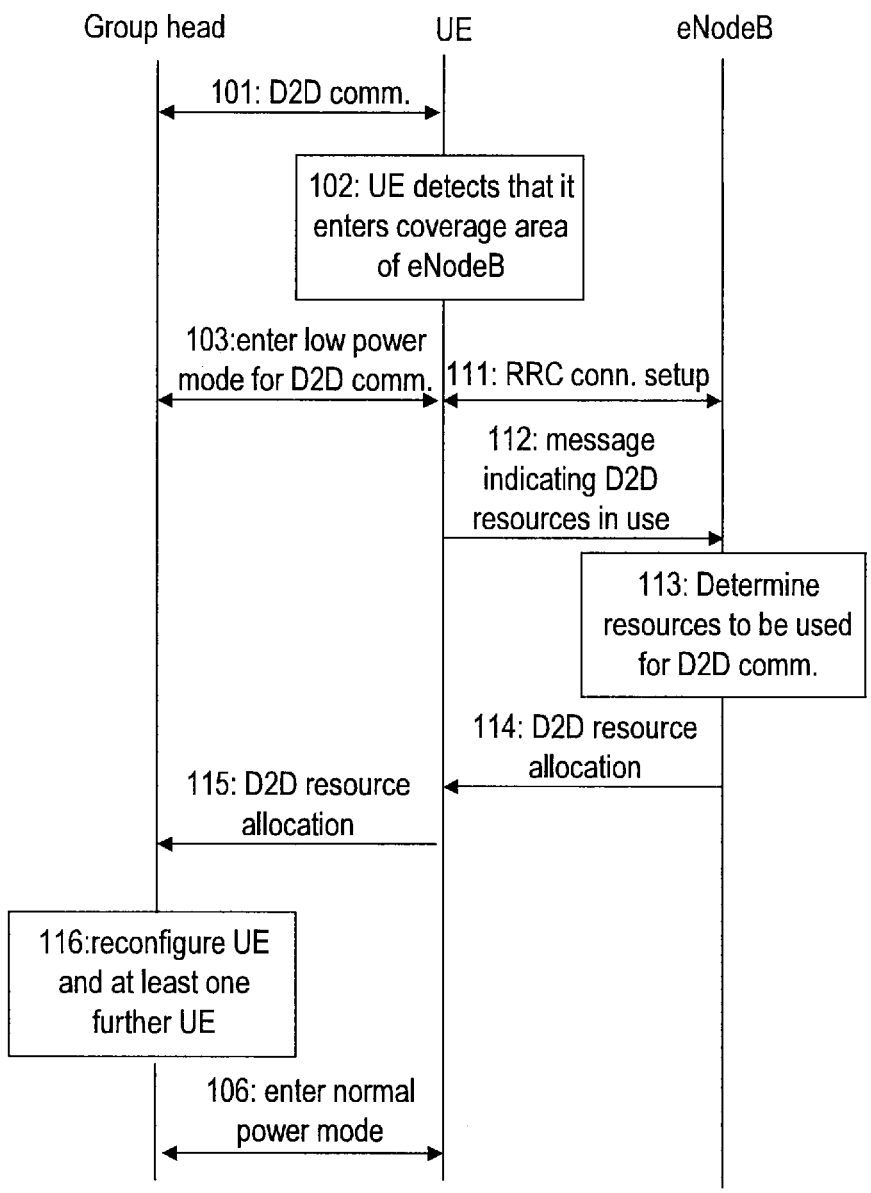
FIG. 14 illustrates signaling in a communication system according to an embodiment.

FIG. 14 is a diagram which shows signaling in a communication system according to an embodiment. In the signaling of FIG. 14, the UE and the group head may enter a low transmit power mode as described with reference to FIG. 12.

An RRC connection setup 111 may be performed between the UE and the eNodeB. The UE may perform an attach/packet data network (PDN) connection establishment.

The UE may transmit a message 112 which indicates the resources used in the D2D communication group, e.g. for D2D communication between the UE and the group head. The resources may be periodic uplink resources. The message 112 may indicate subcarriers and/or a periodicity of the periodic uplink resources used for the D2D communication. The message 112 may indicate a size of the resources for the D2D communication in the time domain and/or frequency domain.

The signaling at 111 and the transmission of the message 112 may be performed using a large transmit power, e.g. the maximum transmit power. The reduction in the transmit power for the D2D communication does not need to lead to a reduction in the transmit power for communication from the UE to the eNodeB over the air interface of the cellular communication network.

At 113, when receiving the message 112, the eNodeB determines which resources are to be used for the D2D communication within the D2D communication group. The eNodeB may determine the resources such that they do not give rise to a significant interference with other radio signals received or transmitted by the eNodeB. The eNodeB may determine the resources for the D2D communication such that the D2D communication does not interfere with other uplink radio signals received by the eNodeB.

The eNodeB informs the UE of the allocated resources for the D2D communication by transmitting a D2D resource allocation message 114. The D2D resource allocation message 114 may include information on subcarrier frequencies and/or time slots and/or a periodicity of the resources allocated for the D2D communication.

The UE may relay the D2D resource allocation message 114 by forwarding a D2D resource allocation message 115 to the group head.

At 116, the group head may reconfigure the UE and, optionally, at least one further UE of the D2D communication group in accordance with the allocated resources. The group head may set the resources used for D2D communication by the UE, the group head and, optionally, the at least one further UE in accordance with the D2D resource allocation message 115. Reconfiguring the UE and the at least one further UE may comprise informing the at least one further UE of the allocated resources, for example.

At 106, when the D2D communication has been configured in accordance with the D2D resource allocation message 115, the UE and the group head may increase the transmit power for the D2D communication again from the reduced transmit power level.

A wide variety of other triggering events may be used to terminate the lower transmit power mode. For illustration, when the UE detects that it is no longer located within the coverage area of the eNodeB, it may transmit an other report message to the group head. The group head and the UE may then return to the normal transmit power mode again.

In any one of the signaling flows explained herein, reducing the transmit power for the D2D communication and/or returning to the normal, greater transmit power for the D2D communication may comprise a signaling between the UE, the group head, and optionally also at least one further UE of the D2D communication group. An exemplary implementation will be described in more detail with reference to FIG. 15.

Figure 15:
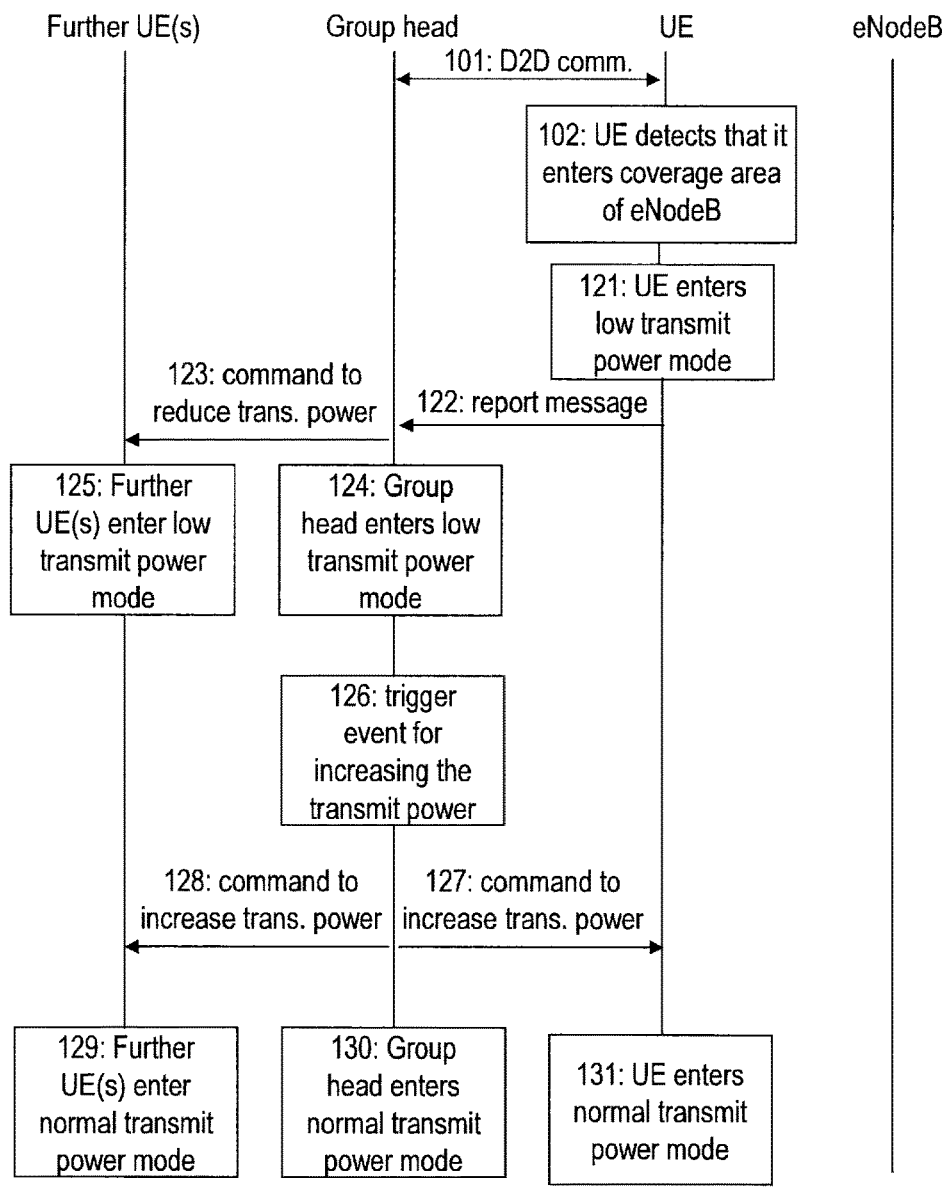
FIG. 15 illustrates signaling in a communication system according to an embodiment.

FIG. 15 is a diagram which shows signaling in a communication system according to an embodiment. In the signaling of FIG. 15, the UE and the group head may initially perform D2D communication 101 using a first transmit power. The UE may detect that it enters the coverage area of the eNodeB at 102.

The detection that the UE enters the coverage area at 102 triggers the UE to enter the low transmit power mode at 121. The transmit power of the UE may be set to a level which ensures that control signaling at a low data rate remains possible. The transmit power of the UE may be set to the minimum level which guarantees that control signaling between the UE and the group head remains possible. The detection that the UE enters the coverage area at 102 triggers the UE to transmit a report message 122 to the group head via D2D communication. The report message 122 may indicate that the UE has entered the coverage area of the eNodeB from out-of coverage of the eNodeB.

Receipt of the report message 122 may trigger the group head to transmit a command 123 to reduce the transmit power for the D2D communication. The group head may transmit the command 123 to at least one further UE of the D2D communication group. The group head may broadcast the command 123 to all UEs of the D2D communication group, including the UE which transmitted the report message 122. The group head may broadcast the command 123 selectively only to those UEs of the D2D communication group which are located within the coverage area of the eNodeB.

Receipt of the report message 122 triggers the group head to enter the low transmit power mode at 124. Receipt of the command 123 triggers the at least one further UE to enter the low transmit power mode at 125. D2D communication between the UE, the group head and the at least one further UE may then be performed using a transmit power which is less than a transmit power used by the UE and group head in the D2D communication 101.

At 126, the group head may detect a trigger event which indicates that the transmit power may be increased again for the D2D communication. The trigger event may be the allocation of resources for the D2D communication by the eNodeB, as was explained in detail with reference to FIG. 14. The trigger event may be a confirmation message from the eNodeB which indicates that the resources presently used by the UE and group head for the D2D communication do not overlap or are otherwise unlikely to cause interference. Any such message may be relayed to the group head by the UE which is located within the coverage area of the eNodeB.

The trigger event detected at 126 causes the group head to transmit an other command 127 to the UE to increase the transmit power of the UE compared to the low transmit power mode. In response to receiving the other command 127, at 131 the UE starts using a normal transmit power level. The normal transmit power level is greater than the transmit power level in the low transmit power mode for the D2D communication. The trigger event detected at 126 causes the group head to transmit the other command 128 to the at least one further UE to increase the transmit power of the at least one further UE compared to the low transmit power mode. In response to receiving the other command 128, at 129 the at least one further UE starts using the normal transmit power level. The normal transmit power level is greater than the transmit power level in the low transmit power mode for the D2D communication. In response to transmitting the other command 127, at 130 the group head starts using the normal transmit power level. The normal transmit power level is greater than the transmit power level in the low transmit power mode for the D2D communication. After the transmit power level has been increased again, the UE may transmit radio signals in D2D communication with a transmit power which may be equal to that used by the UE in the D2D communication 101. Similarly, the group head may transmit radio signals in D2D communication with a transmit power which may be equal to that used by the group head in the D2D communication 101. The original transmit powers for the D2D communication may thereby be restored.

Various modifications of the signaling described with reference to FIG. 15 may be used in further embodiments. For illustration, when the UE detects that it enters the coverage area of the eNodeB at 102, the UE may not autonomously enter the low transmit power mode. The UE may enter the low transmit power mode only in response to receiving the command 123 to reduce the transmit power.

The command 123 and the other command 127 transmitted by the group head may have any one of a variety of formats.

Figure 16:
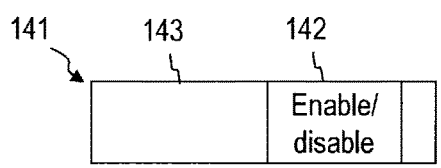
FIG. 16 shows a command transmitted by a group head according to an embodiment to adjust a transmit power.

FIG. 16 illustrates a structure of a command 141 which may be used for increasing or decreasing the transmit power in the D2D communication. The command 141 may include an indicator field 142 which comprises at least one bit which indicates whether a low transmit power mode is to be enabled or disabled. To transmit the command 123 for decreasing the transmit power, the group head may generate and output the command 141 with the indicator field 142 being set to enable the low transmit power mode. In response to receiving the command 141 with the indicator field 142 being set to enable the low transmit power mode, the UE and/or the further UE(s) reduce the transmit power for D2D communication.

To transmit the command 127, 128 for increasing the transmit power, the group head may generate and output the command 141 with the indicator field 142 being set to disable the low transmit power mode. In response to receiving the command 141 with the indicator field 142 being set to disable the low transmit power mode, the UE and/or the further UE(s) increase the transmit power for D2D communication.

The command 141 may include additional data field(s) 143 which identify the command 141 and/or which provide address information of the recipient.

Figure 17:
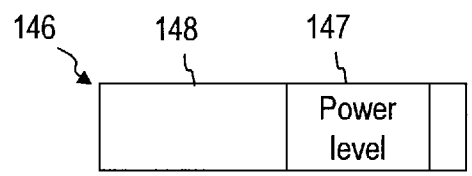
FIG. 17 shows a command transmitted by a group head according to an embodiment to adjust a transmit power.

FIG. 17 illustrates a structure of a command 146 which may be used for increasing or decreasing the transmit power in the D2D communication. The command 146 may include an indicator field 147 which includes a value to which the transmit power is to be set. The indicator field 147 may encode a numerical value of the transmit power, may encode an increment or decrement of the transmit power, or may otherwise define a change in the transmit power for the D2D communication. To transmit the command 123 for decreasing the transmit power, the group head may generate and output the command 146 with the indicator field 147 being set to decrease the transmit power of the UE and/or the at least one further UE. In response to receiving the command 146 with the indicator field 147 being set to indicate a decreased transmit power, the UE and/or the further UE(s) reduce the transmit power for D2D communication.

To transmit the command 127, 128 for increasing the transmit power, the group head may generate and output the command 146 with the indicator field 147 being set to indicate an increased transmit power. In response to receiving the command 146 with the indicator field 147 being set to indicate the increased transmit power, the UE and/or the further UE(s) increase the transmit power for D2D communication.

The command 146 may include additional data field(s) 143 which identify the command 146 and/or which provide address information of the recipient.

While signaling flows and command have been described with reference to FIG. 12 to FIG. 17 in the context of a UE entering a coverage area of an eNodeB, the techniques may also be used when the UE enters a coverage area of a further D2D communication group, as illustrated in FIG. 3 and FIG. 4. A group head of the further D2D communication group may then provide information on the resources which can be used by the D2D communication group to reduce interference problems, for example.

Figure 18:
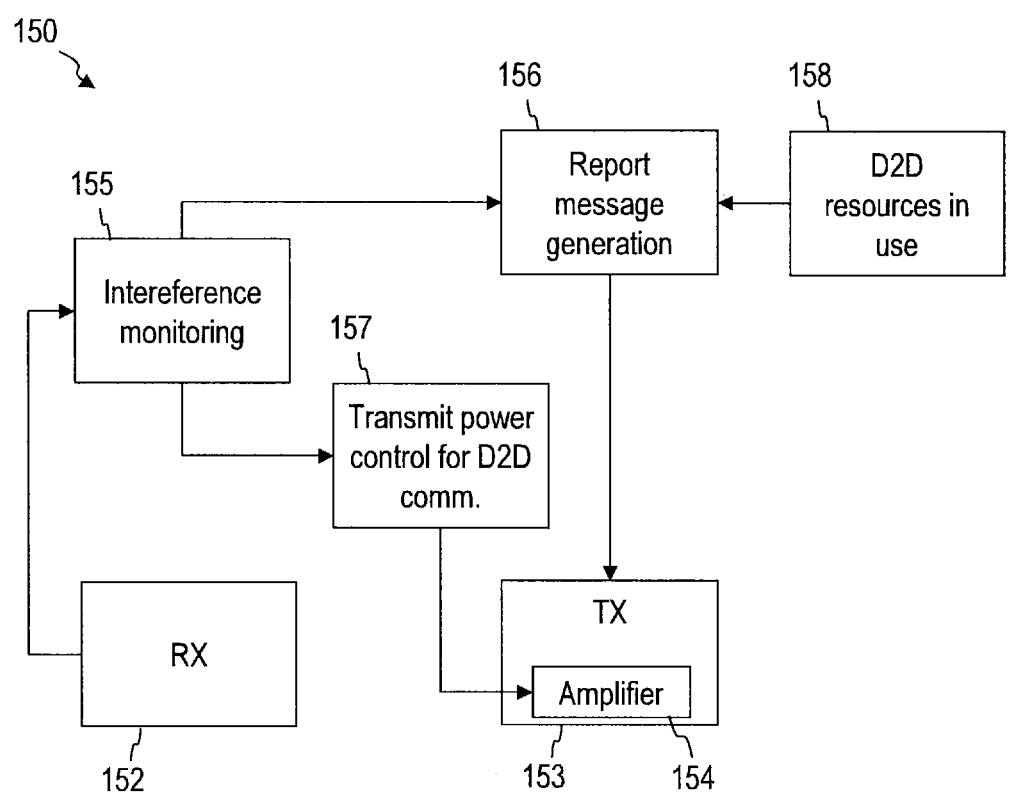
FIG. 18 is a functional block diagram representation of a user equipment according to an embodiment.

FIG. 18 is a functional block diagram 150 of a UE 4 according to an embodiment. The various functions may be performed by the processing device 34 of the UE 4 according to an embodiment. Not all of the various functions need to be implemented in the UE according to an embodiment.

The processing device 34 of the UE 4 may be configured to perform interference monitoring 155. The interference monitoring 155 may consist in determining whether the UE enters the coverage area of a radio communication unit. The processing device 34 may monitor signals received at the receiver path 152 to detect whether the UE 4 enters the coverage area of a radio communication unit, for example. The interference monitoring 155 may include additional or alternative techniques, such as comparing an indicator for interference between signals received from the air interface of a cellular communication network and radio signals of the D2D communication.

The processing device 34 of the UE 4 may perform a report message generation function 156. The report message generation function 155 may control a transmitter path 153 of the UE 4 to transmit a report message to a group head of the D2D communication group. The report message may be generated to indicate that the UE 4 has entered the coverage area of the radio communication unit. The report message generation function 156 may generate the report message to the group head of the D2D communication group using D2D resources stored in a memory or storage device 158.

The processing device 34 of the UE 4 may perform a transmit power control function 157. The transmit power control function 157 may control an output power of the UE 4 in D2D communication. The transmit power control function 157 may set at least one parameter of at least one circuit element of the transmitter path 153. For illustration, the transmit power control function 157 may adjust a gain of at least one amplifier 154 of the transmitter path 153 to reduce the transmit power for entering a low transmit power mode.

In any one of the various embodiments, a transmit power of a UE may be temporarily decreased for the D2D communication when the UE moves from out-of-coverage into coverage of a radio communication unit. The transmit power may be increased again when at least one other procedure to mitigate interference problems has been completed, e.g. by resource allocation by a base station.

In any one of the various embodiments, the D2D communication performed by a UE may include the transmission and/or reception of messages which takes place over the same interface with which the UE communicates with the RAN.

In any one of the various embodiments, the reduction in transmit power may be performed selectively depending on whether the D2D communication is performed for a public safety use case. When the D2D communication group has been established to relay an emergency call, for example, the transmit power for the D2D communication may be kept high even if this may cause interference.

Modifications or alterations may be implemented in other embodiments. For illustration, a wide variety of different information elements which at least partially define a transmit power in the low transmit power mode may be transmitted to a UE. For further illustration, when a base station allocates resources for the D2D communication, the base station may transmit any one of a wide variety of different information elements which at least partially define the allocated resources, e.g. a size of the allocated resources in the time domain and/or a size of the allocated resources in the frequency domain, etc.

While exemplary scenarios have been described in which embodiments of the invention may be used, the methods, devices and systems of embodiments may be used in a wide variety of additional scenarios. For illustration, the disclosed techniques may also be used when the UE moves from one cell of a cellular communication network to another cell of the cellular communication network.

Embodiments of the invention may be used to mitigate interference between D2D communication and radio signals received or transmitted by a radio communication unit which does not participate in the D2D communication.

The invention claimed is:

1. A method of adjusting a transmit power for a device-to-device communication, the method comprising:
   detecting, by a user equipment which performs the device-to-device communication using the transmit power, that the user equipment enters a coverage area of a radio communication unit, wherein the radio communication unit is a base station of a cellular communication network, the base station defining a cell having a cell identifier, and the coverage area is the cell;
   selectively decreasing the transmit power of the user equipment for the device-to-device communication in response to detecting that the user equipment enters the coverage area of the radio communication unit;
   transmitting, by the user equipment, a report message to another user equipment using the device-to-device communication to indicate that the user equipment has entered the coverage area of the radio communication unit associated with the cell identifier;
   receiving, from the radio communication unit, a resource allocation for the device-to-device communication; and
   controlling the transmit power of the user equipment for the device-to-device communication after receiving the resource allocation.

2. The method of claim 1,
wherein the report message comprises an interference monitor report.

3. The method of claim 1, further comprising:
transmitting, by the other user equipment, a command to reduce the transmit power in response to receiving the report message.

4. The method of claim 3,
wherein the other user equipment is a group head of a device-to-device communication group, wherein the device-to-device communication group includes the user equipment and at least one further user equipment, and
wherein the other user equipment transmits the command to reduce the transmit power to the at least one further user equipment of the device-to-device communication group.

5. The method of claim 3,
wherein the command to reduce the transmit power comprises an indicator for a reduced transmit power level.

6. The method of claim 1, further comprising:
detecting, by the other user equipment, a trigger event for increasing the transmit power, and
transmitting, by the other user equipment, an other command to the user equipment to increase the transmit power of the user equipment in response to detecting the trigger event.

7. The method of claim 1,
wherein selectively decreasing the transmit power of the user equipment further comprises:
monitoring an interference between radio resources allocated to the user equipment for the device-to-device communication and other radio resources which are used by the radio communication unit for receiving or transmitting the radio signals.

8. A user equipment, comprising:
a wireless interface for communication with a cellular communication network; and
a processing device coupled to the wireless interface and configured to:
   control the wireless interface to perform a device-to-device communication;
   detect that the user equipment enters a coverage area of a radio communication unit, wherein the radio communication unit is a base station of the cellular communication network, the base station defining a cell having a cell identifier, and the coverage area is the cell;
   selectively decrease a transmit power of the user equipment for the device-to-device communication when the device-to-device communication causes interference with radio signals which are transmitted or received by the radio communication unit;

control the wireless interface to transmit a report message to an other user equipment using the device-to-device communication to indicate that the user equipment has entered the coverage area of the radio communication unit associated with the cell identifier;

receive, from the radio communication unit, a resource allocation for the device-to-device communication; and control the transmit power of the user equipment for the device-to-device communication after receiving the resource allocation.

9. A communication system, comprising:

the user equipment of claim 8, and a group head for a device-to-device communication group, comprising:

a wireless interface for device-to-device communication; and a processing device coupled to the wireless interface and configured to:

receive, via the wireless interface, a report message from a user equipment of the device-to-device communication group which indicates that the user equipment has entered a coverage area of a radio communication unit; and control the wireless interface to transmit a command to the user equipment or to at least one further user equipment of the device-to-device communication group to reduce a transmit power for the device-to-device communication in response to receiving the report message.

10. A group head for a device-to-device communication group, the group head being one user equipment of a plurality of user equipment, comprising:

a wireless interface for device-to-device communication; and a processing device coupled to the wireless interface and configured to:

receive, via the wireless interface, a report message from a user equipment of the device-to-device communication group which indicates that the user equipment has entered a coverage area of a radio communication unit, wherein the radio communication unit is a base station of a cellular communication network the base station defining a cell having a cell identifier, and the coverage area is the cell; and control the wireless interface to transmit a command to the user equipment or to at least one further user equipment of the device-to-device communication group to reduce a transmit power for the device-to-device communication in response to receiving the report message, wherein the user equipment receives, from the radio communication unit, a resource allocation for the device-to-device communication, and controls the transmit power of the user equipment for the device-to-device communication after receiving the resource allocation.

11. The group head of claim 10, wherein the command comprises an indicator for a reduced transmit power level of the user equipment, and wherein the processing device is configured to decrease a transmit power of the group head for the device-to-device communication when the report message is received.

12. The group head of claim 10, wherein the processing device is further configured to detect a trigger event for increasing the transmit power, and transmit an other command to the user equipment to increase the transmit power of the user equipment in response to detecting the trigger event.

13. The group head of claim 12, wherein the trigger event is a resource allocation for the device-to-device communication.

* * * * *